United States Patent Office.

MASON E. LEONARD, OF MANCHESTER, NEW JERSEY, ASSIGNOR TO THE LEONARD SMOKELESS POWDER COMPANY, OF SAME PLACE.

SMOKELESS POWDER.

SPECIFICATION forming part of Letters Patent No. 507,279, dated October 24, 1893.

Application filed September 13, 1893. Serial No. 485,417. (No specimens.)

*To all whom it may concern:*

Be it known that I, MASON E. LEONARD, of Manchester, in the county of Ocean and State of New Jersey, have invented a new and useful Improvement in Gunpowder, of which the following is a specification.

My invention relates to an improvement in gun powder with the object in view of producing a high power, smokeless explosive.

The powder consists of nitroglycerine, gun cotton, lycopodium and a neutralizer of free acid—such for example as urea crystals or dinitrobenzol—with or without the addition of oil. The above ingredients are combined in the proportions and in the manner hereinafter set forth, the particular proportions of the several ingredients being varied somewhat to adapt the powder to guns of varying calibers. For the United States thirty caliber rifle the following proportions have given very satisfactory results: one hundred and fifty parts by weight of nitroglycerine, fifty parts by weight of gun cotton, ten parts by weight of lycopodium, and four parts by weight of finely triturated urea crystals. If dinitrobenzol is used instead of the urea crystals four parts by weight should be used.

In practice I first mix the several ingredients above named together and then introduce as a solvent either acetone alone or acetone combined with acetate of anyl or acetone combined with acetic ether. The amount of solvent which I employ is a matter of judgment, care being taken that a sufficient quantity be introduced to thoroughly dissolve the gun cotton. The error should be on the side of introducing too much rather than too little and, as I have not yet determined the least amount of the solvent which is necessary to dissolve the gun cotton, I have used successfully one and one-half times as much by weight of the solvent as I used of gun cotton. The form of gun cotton which I prefer to employ is trinitrocellulose. After the introduction of the solvent the mixture will be in a condition of viscid liquid or of a pasty nature and after stirring it as a person would mix mortar, it is allowed to stand in sealed jars for a period of twelve hours, more or less. The mixture is then agitated, either by means of hand or by a mixer or beater of any well known or approved form such for example as a "Dover egg beater," built upon a scale adapted to the work in hand, for the purpose of evaporating the solvent and bringing the active ingredients of the explosive into intimate contact. The mass is then formed into a cake or granules of the desired size by pressure in suitable molds. The mold employed should be made to correspond with the size of grain desired and is purely a matter of mechanical judgment. I have used for the purpose of molding the grains a macaroni machine in which the material is pressed through perforations by means of a plunger, the result being to form the mass into long, flexible rods. To form small grains, these rods are made extremely small, one-twentieth of an inch in diameter for example, and are then cut up into short pieces by feeding them to a cutter in the nature of an ordinary hay cutter.

For use in cannon, where a further deterring and moisture proof effect is desired, I add to the ingredients above named seven parts by weight of cotton seed oil.

What I claim is—

1. Gun powder, composed of nitroglycerine, gun cotton, lycopodium and a neutralizer of free acid—such for example as urea crystals or dinitrobenzol.

2. Gun powder, composed of nitroglycerine, gun cotton, lycopodium, a neutralizer of free acid—such for example as urea crystals or dinitrobenzol—and oil.

MASON E. LEONARD.

Witnesses:
FREDK. HAYNES,
GEORGE BARRY.